United States Patent [19]

Kauffeld

[11] 3,995,338
[45] Dec. 7, 1976

[54] POLLEN TRAP WITH CLEANING GRID

[75] Inventor: Norbert M. Kauffeld, Tucson, Ariz.

[73] Assignee: The United States of America as represented by the Secretary of Agriculture, Washington, D.C.

[22] Filed: Oct. 31, 1974

[21] Appl. No.: 519,727

[52] U.S. Cl. .................................. 6/4 R; 6/12 M
[51] Int. Cl.² .................................. A01K 47/06
[58] Field of Search .................. 6/4 R, 4 A, 4 B, 1, 6/12 M

[56] References Cited

UNITED STATES PATENTS

| 137,645 | 4/1873 | Woodside | 6/4 R |
| 228,666 | 6/1880 | Moore | 6/4 R |
| 307,737 | 11/1884 | Alley | 6/4 A |
| 1,470,112 | 10/1923 | Cottam | 6/4 R |
| 1,636,635 | 7/1927 | Holmes | 6/4 B |
| 2,449,348 | 9/1948 | Volgenau et al. | 6/4 R |
| 2,485,879 | 10/1949 | Harwood | 6/12 M |

FOREIGN PATENTS OR APPLICATIONS

| 1,223,455 | 2/1960 | France | 6/12 M |

OTHER PUBLICATIONS

Grout, R. A., *The Hive and the Honey Bee*, Illinois, Dadant & Sons, 1963, pp. 365 and 366.

Root, *ABC and XYZ of Bee Culture*, Ohio, Root, 1966 pp. 514 and 515.

*Primary Examiner*—Louis G. Mancene
*Assistant Examiner*—Jack Q. Lever
*Attorney, Agent, or Firm*—M. Howard Silverstein; David G. McConnell; Salvador J. Cangemi

[57] ABSTRACT

A pollen collecting and trash removal apparatus for use on honey bee colonies in which bees entering from the field with pollen are forced to twist their bodies through a double screen grid with offset squares and lose the pollen pellets which fall through a hardware cloth into a pollen drawer. Bees leaving the hive with trash are forced to drop it, when they have to crawl through a 2 screen grid without offset squares, through a ½ inch hardware cloth into the trash drawer. The hinged lid permits easy removal of both grids for easy access of bees leaving or coming into the hive. The apparatus can remain on the hive throughout a year and still permit easy manipulation of frames in the hive. Pollen and trash drawers are removed from the side of the hive without obstruction to the normal flight of the bees. The use of hardware cloth or wire screen permits the maximum amount of ventilation.

1 Claim, 11 Drawing Figures

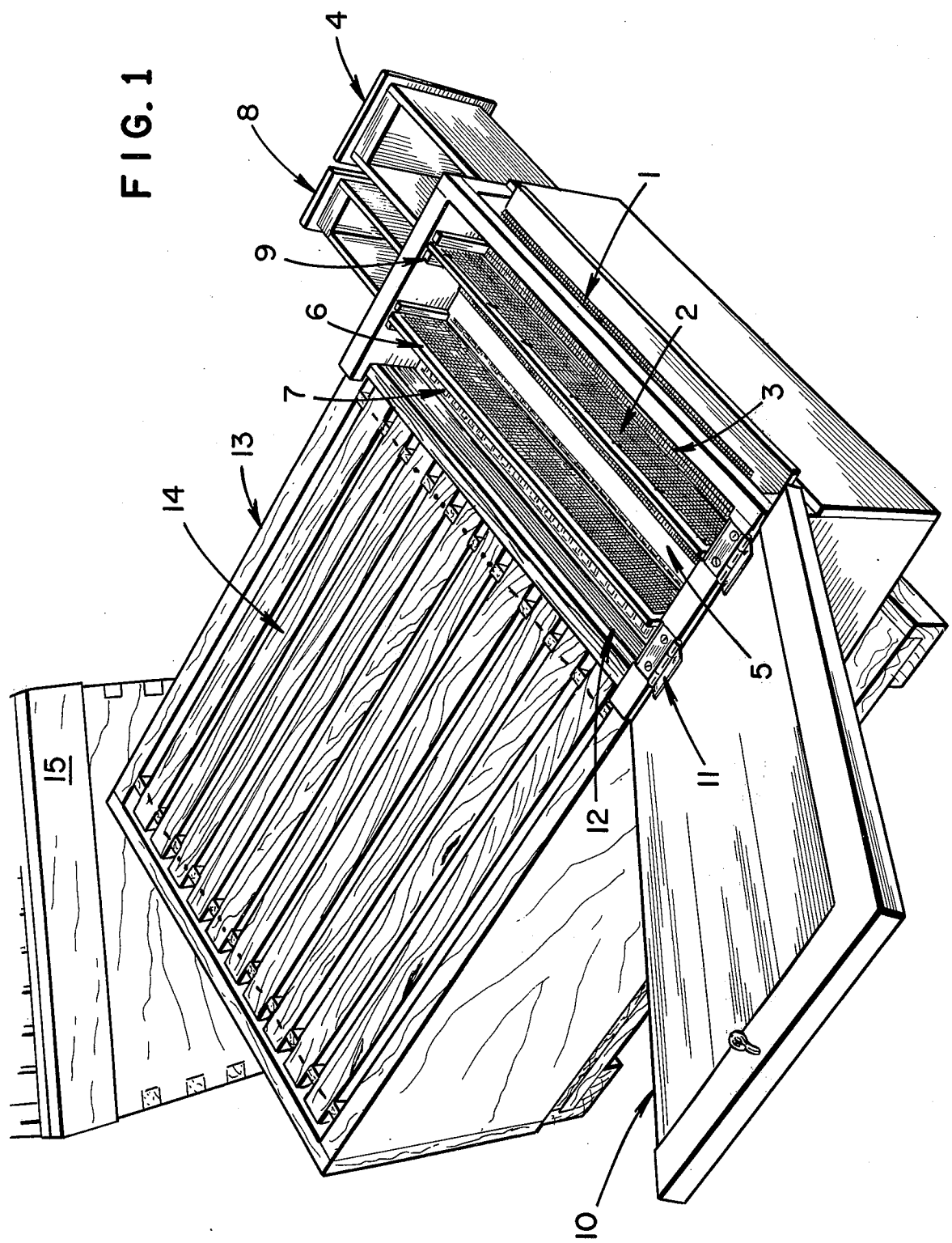

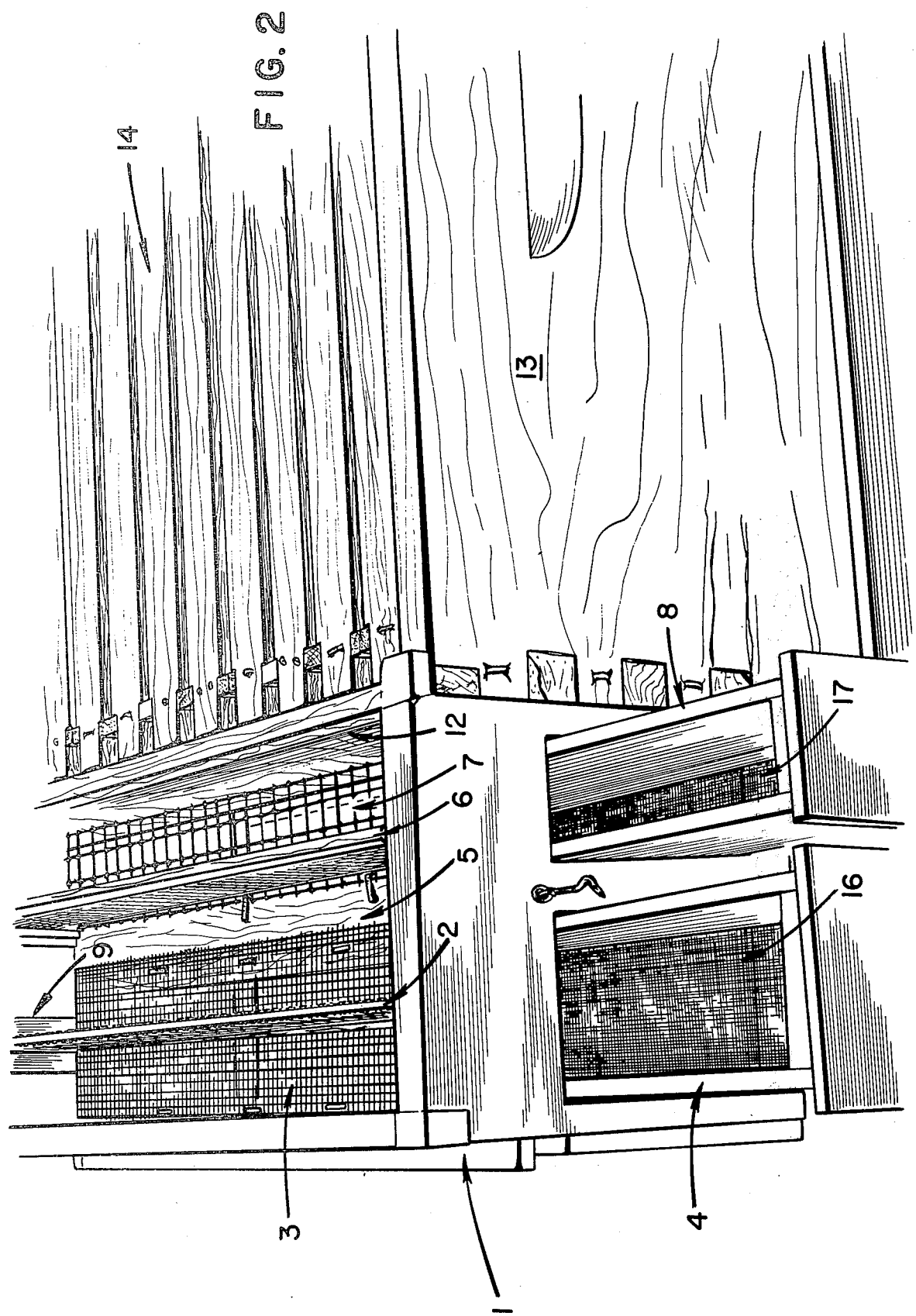

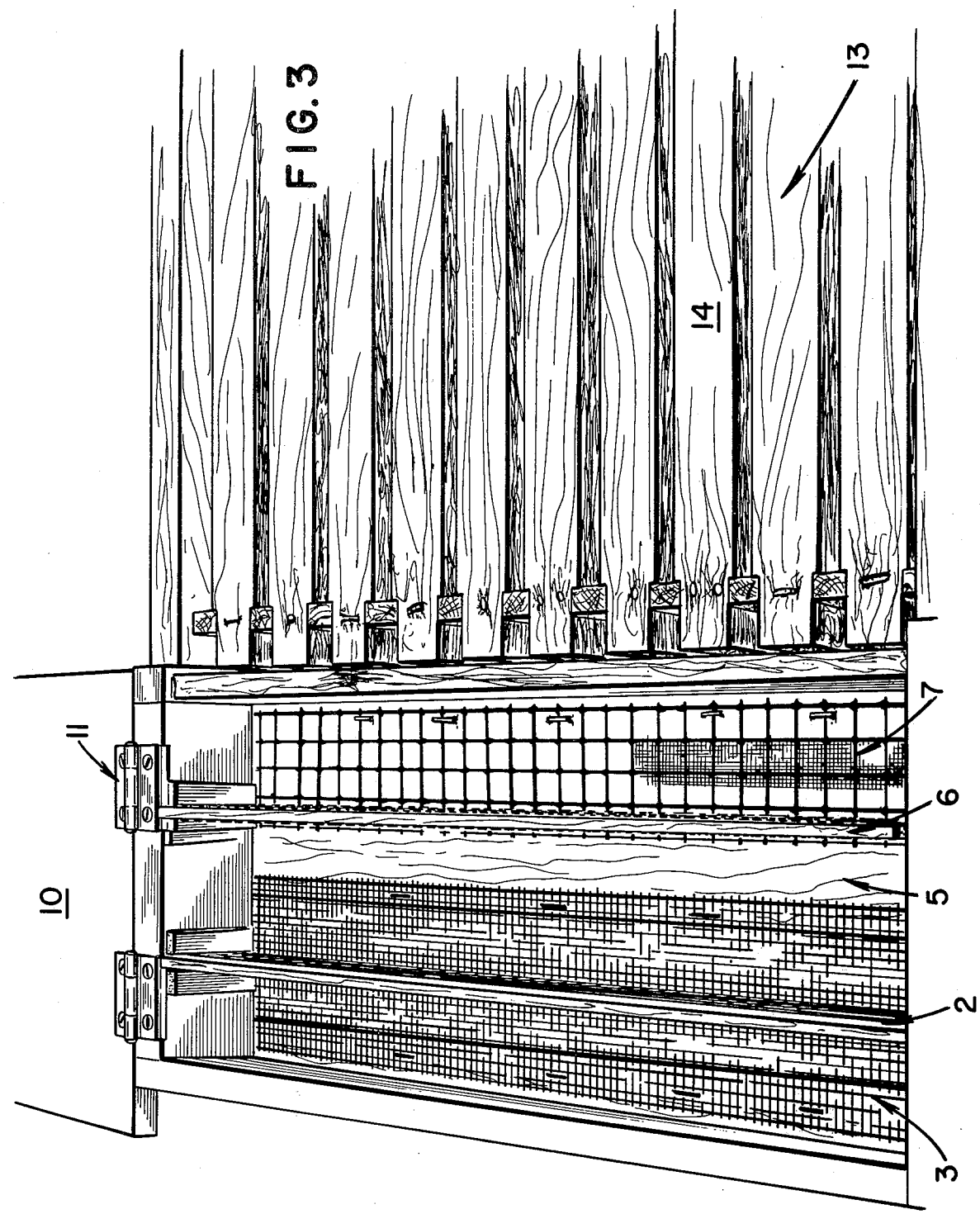

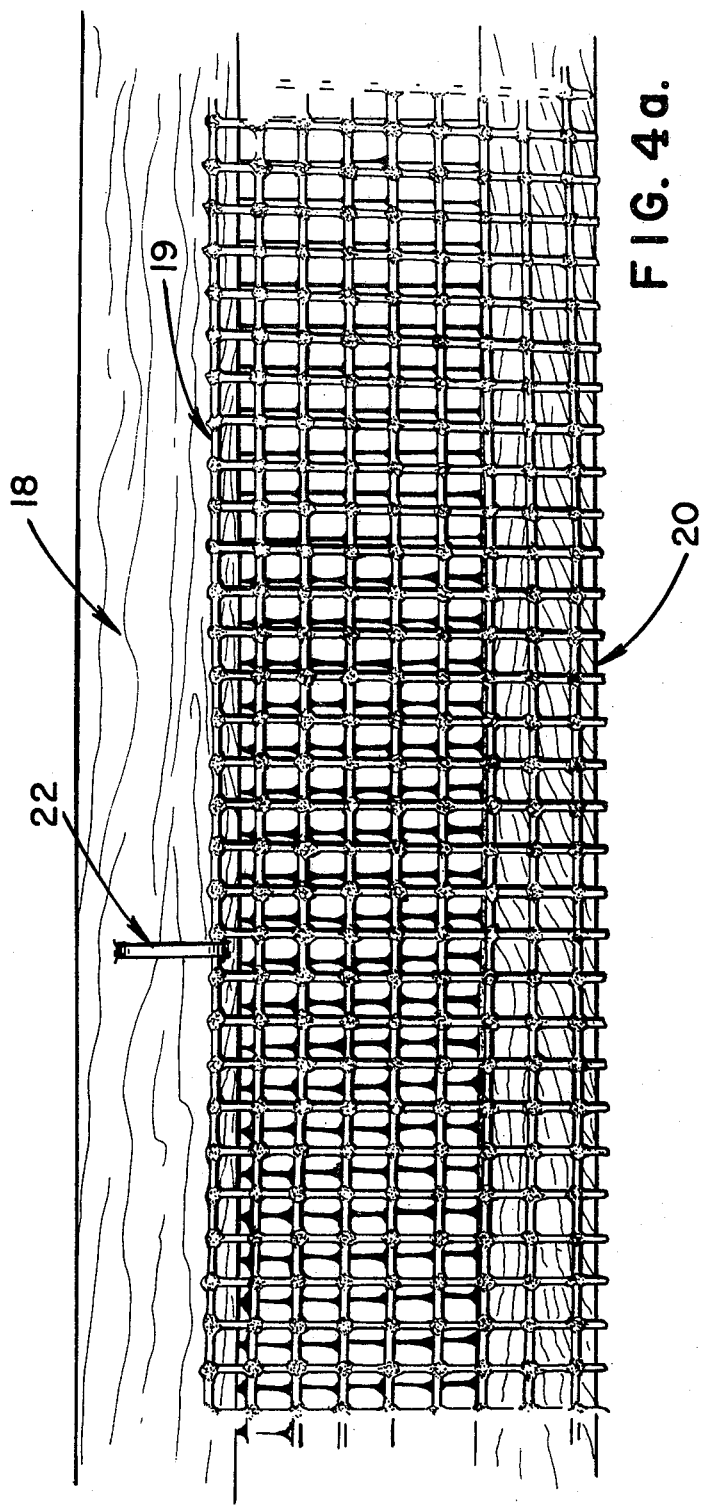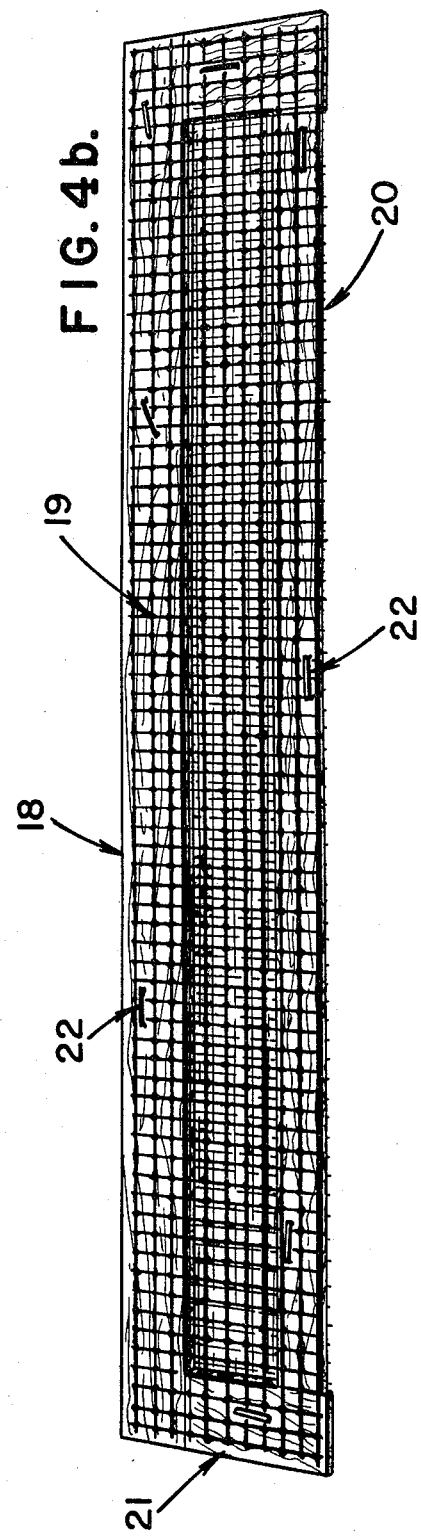

POLLEN TRAP WITH CLEANING GRID

This invention relates to an improved pollen trap. More specifically, this invention relates to a pollen trap which enables continuous manipulations of hive parts without the removal of the trap. The trap of this invention enables beekeepers to collect large amounts of relatively clean pollen which can be fed to the young bees in periods of stress and also can be used in the production of nutrients of the future for higher forms of life, since the pollen is generally proteinaceous.

The main object of this invention is to provide a means of collecting large quantities of pollen which are relatively free of trash. To those skilled in the art of beekeeping, the word "trash" generally refers to bee legs, wings, bits of wax, leaves, and dust particles. This is accomplished by offsetting the two screen in the pollen grid (see drawings), making it more difficult for the bees to slip through without releasing their pollen pellets.

Another object of this invention is to provide a device which would decrease the spreading of a bacterial disease by the honey bee (American foulbrood, AFB), which can be transmitted in pollen which contains bits of trash that could be contaminated with the spores. This is accomplished through the use of a trash grid above the trash drawer. Trash found in pollen traps is generally accumulated by the action of the bees. The bees drop the trash as they crawl through the pollen grid when they leave the hive for the field.

In the prior art there is a pollen trap construction which is common to all. It is an object of this invention to provide a better construction which would yield a cleaner pollen than that provided by the devices of the prior art. A point by point comparison is presented here, showing the basic differences between the pollen traps of the prior art and the trap of the instant invention.

| COMPARATIVE STUDY OF POLLEN TRAP CONSTRUCTION | |
|---|---|
| Items common to all | Items of this invention |
| 1. Wood, wire mesh and metal<br>2. Placement - (Varied)<br>   a. bottom of hive | 1. Wood and wire mesh<br>2. Placement<br>   a. front and at edge<br>      of bottom broodchamber |
| 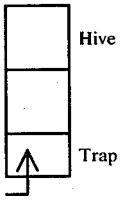<br>b. top of hive | 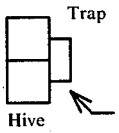<br>b. top broodchamber<br>   set back |
| 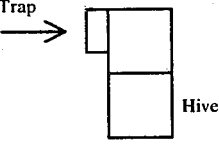<br>c. in entrance of hive | |
| 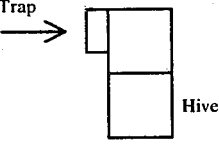<br>d. center of hive | |
| 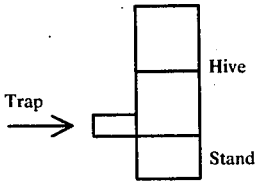 | |
| 3. Single tray at bottom of hive<br>   or single drawer.<br>4. Single grid (2 screens)<br>   a. single screen<br>   b. 2 screens<br>5. Solid lids - must pull out<br>   nails to remove grid.<br>6. Flight activity interrupted<br>   on several traps because | 3. Two drawers<br>   a. for pollen<br>   b. for trash<br>4. Two grids (2 screens each)<br>   a. offset for pollen<br>   b. not offset for trash<br>5. Hinged top for easy grid<br>   removal.<br>6. Pollen and trash drawers<br>   opened from the side. |

-continued
COMPARATIVE STUDY OF POLLEN TRAP CONSTRUCTION

| Items common to all | Items of this invention |
| --- | --- |
| pollen tray or drawer is opened from the front. | Flight activity not disturbed. |
| 7. Trap must be removed to manipulate hive or hive must be removed to clean out the trap below. | 7. Hive and colony can be manipulated without removal of hive bodies. |

Note: Arrows indicate bee flight into the hives.

BACKGROUND AND PRIOR ART

It is well known to those skilled in the art that honey bees utilize large amounts of pollen which is their source of protein food. It is further understood that pollen can be collected from honey bees by means of pollen traps which are attached to hives.

During periods of a shortage of pollen in the field, honey bees reduce the production of new bees and the population in hives decreases. It is at these times of stress that trapped pollen or some mixture of pollen, or some substitute (soybean meal, cottonseed meal, peanut meal, or yeast) is fed in place of pollen.

Prior to this invention pollen traps of various design were in use, but they had only a pollen grid consisting of a single piece of hardware cloth or a piece folded back onto itself. Since there was no trash grid, the pollen was contaminated with large amounts of trash. The lids were nailed onto the hives making it necessary to tear them off if the grids were to be cleaned. Dead bees accumulated in a pile between the hive entrance and the pollen grid creating a stench and a great reduction in ventilation. Prior art also required a beekeeper to remove the pollen trap before the hive could be manipulated. Prior art also caused the bees to become agitated increasing stinging because the traps were attached to the front of the hive with the removal of the pollen drawers from the front where bees often hang in large clusters because of the poor ventilation through the traps. The individual removing the pollen from the pollen drawer had to drop or wipe off the clustered bees and also interrupted the flight of bees coming into or leaving the hive since he had to stand in front of the hive. Prior art placed at the bottom of the hive had all the trash and dead bees from inside the colony falling into the pollen drawer contaminating the pollen.

Also prior to this invention, pollen was trapped with large amounts of trash (wax particles, bee body parts, and other bits of material) in the pollen. Pollen with excessive amounts of trash often is not eaten by bees and becomes a loss of effort, time, and cash. Pollen with trash contaminated with a bee disease infected healthy colonies that were fed trapped pollen.

During recent years, pollen has been collected for human consumption and prepared in the form of cakes, cookies, and candy. Because of the need for meeting certain health standards, it is essential that the pollen is as free of foreign material as possible. With the present worldwide population explosion, some other sources of protein will have to be developed, and pollen could be one of them.

A third object of this invention is to reduce the amount of labor needed to operate a colony of bees when the pollen trap is attached to the hive.

A fourth object is to reduce the amount of irritation to a colony of bees and thereby reduce stinging when pollen is being collected from the trap.

A fifth object is to enable rapid changeover from trapping pollen from a hive to not trapping it.

A sixth object is to provide a means for easy removal of dead bees and trash from the trap without taking the trap off the hive. This does away with the unfavorable odor of decaying dead bees.

These and other object and advantages of this invention will be shown from the following drawings, specifications, and claims set forth herein.

FIG. 1 is a perspective view from above, in front, and to the right side of the hive with the pollen trap which is the invention attached to the hive.

FIG. 2 is a perspective view from the left side of the hive with the pollen trap attached.

FIG. 3 is a composite view of the invention taken from above and to the left of the hive with the pollen trap attached.

FIG. 4 is a view of one of the grids in the invention and is a principal part of it.

5 is a back view of the pollen trap.

Figure 6:
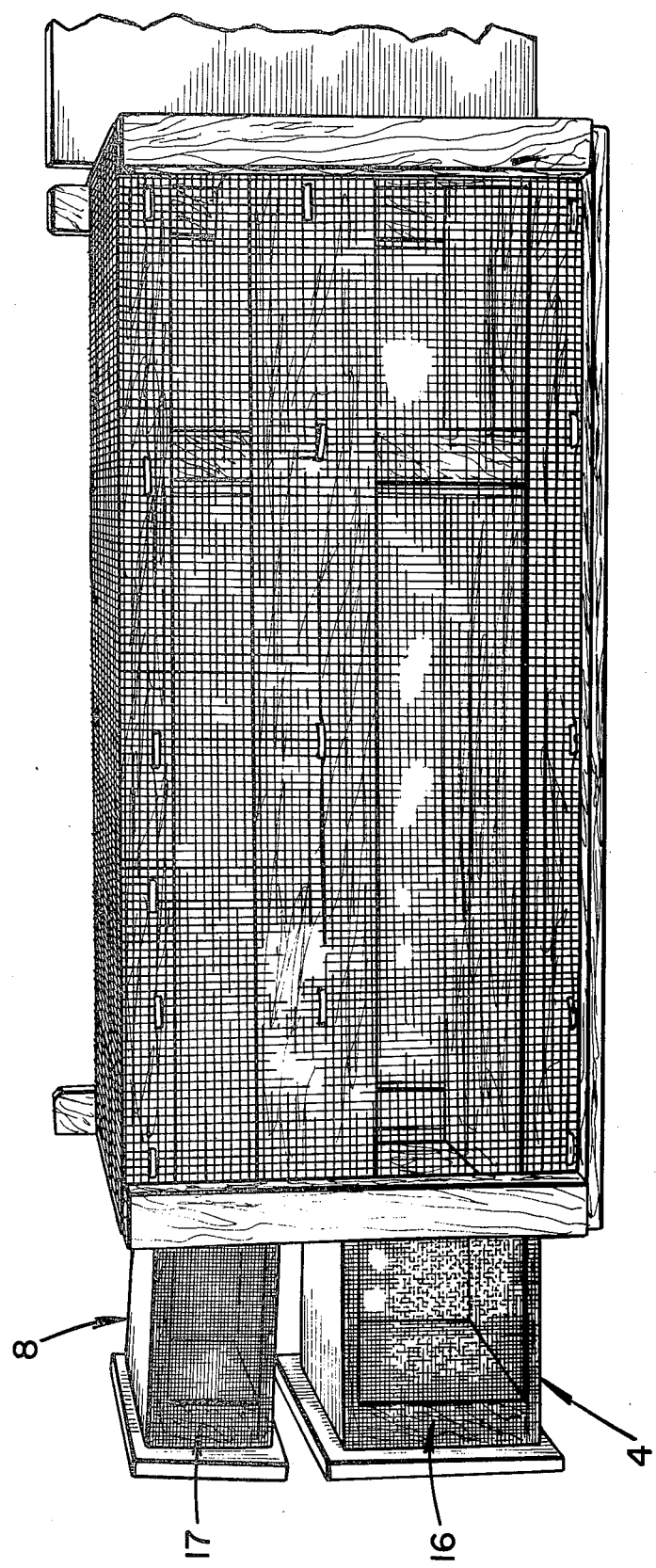

FIG. 6 is a bottom view of the invention detached from the hive.

Figure 7:
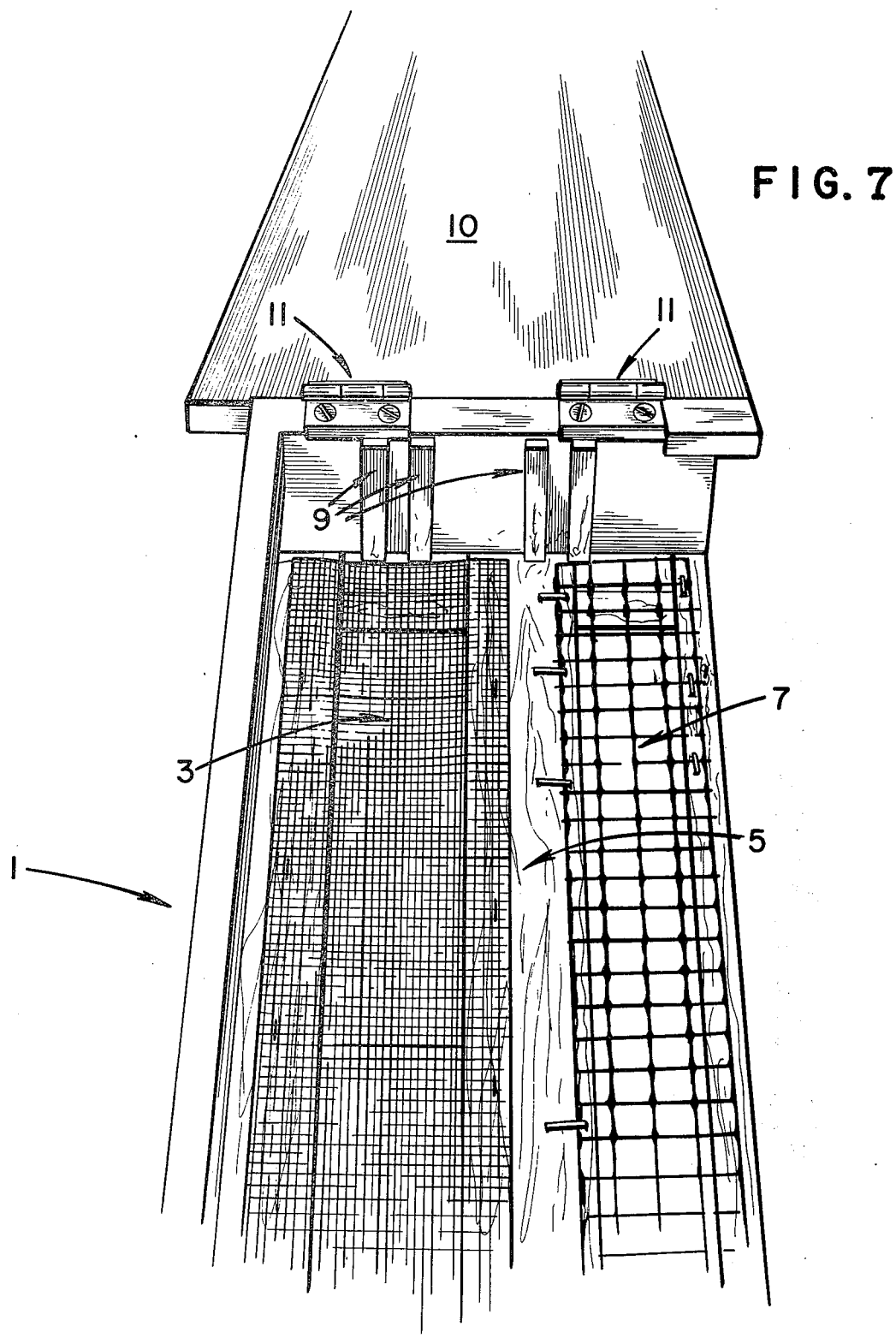

FIG. 7 is a top and end view of the invention showing the inside of the invention without the grids.

Figure 8:
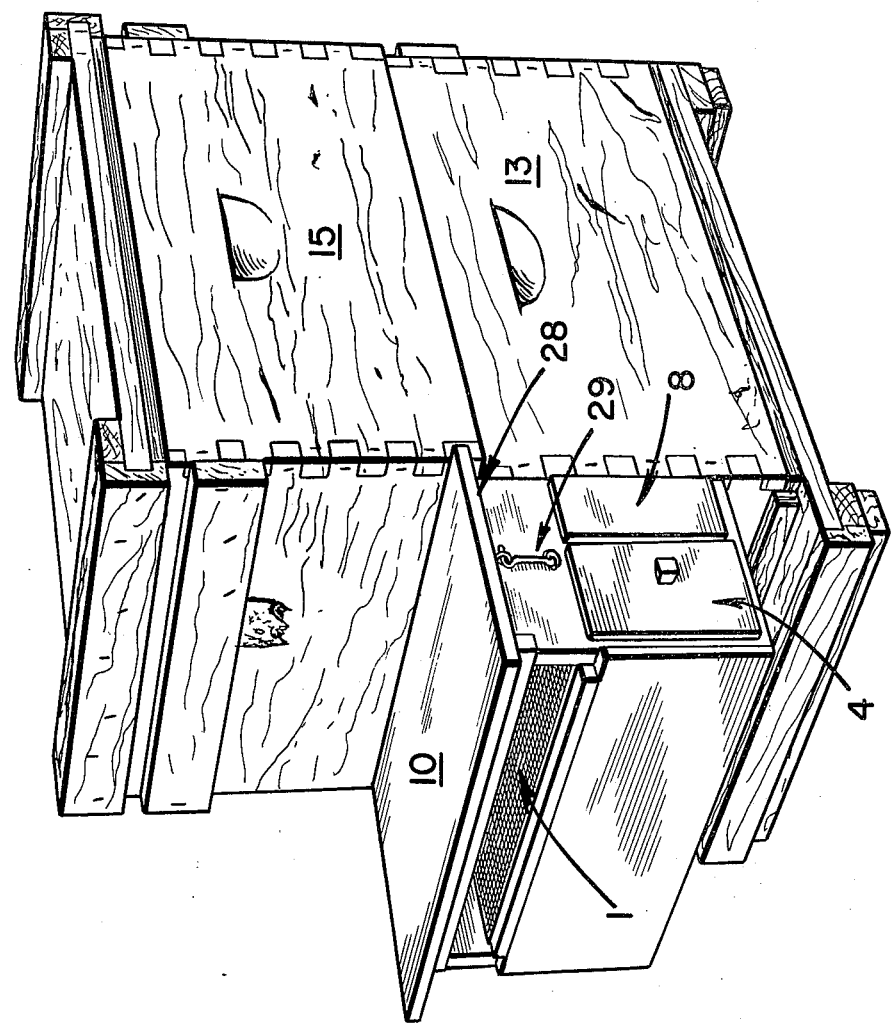

FIG. 8 is a picture of the trap attached to a 2 brood chambered hive.

Figure 9:
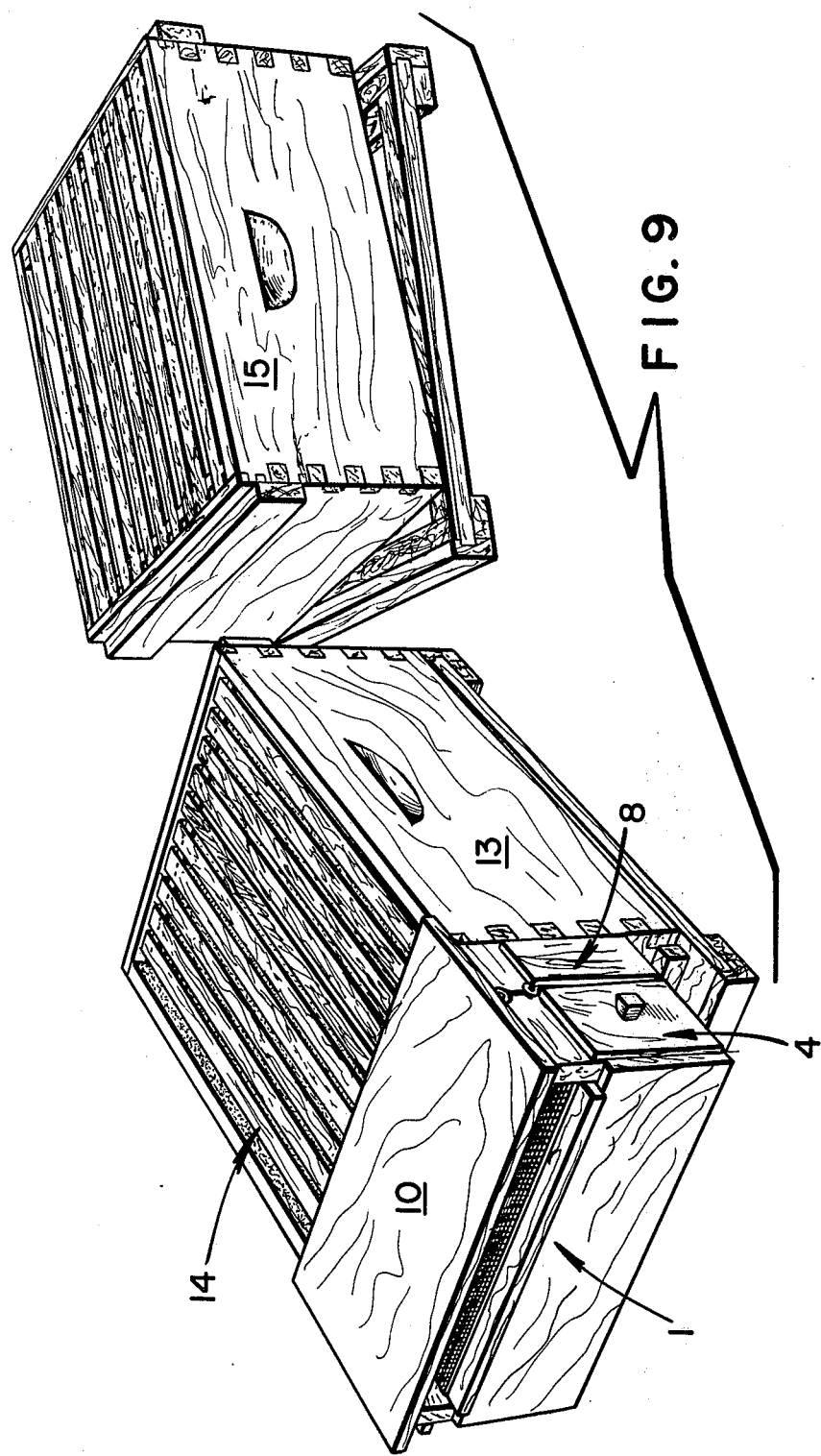

FIG. 9 is a picture of the trap attached to the bottom brood chamber with the top brood chamber set aside for manipulation of the frames in the bottom brood chamber.

Figure 10:
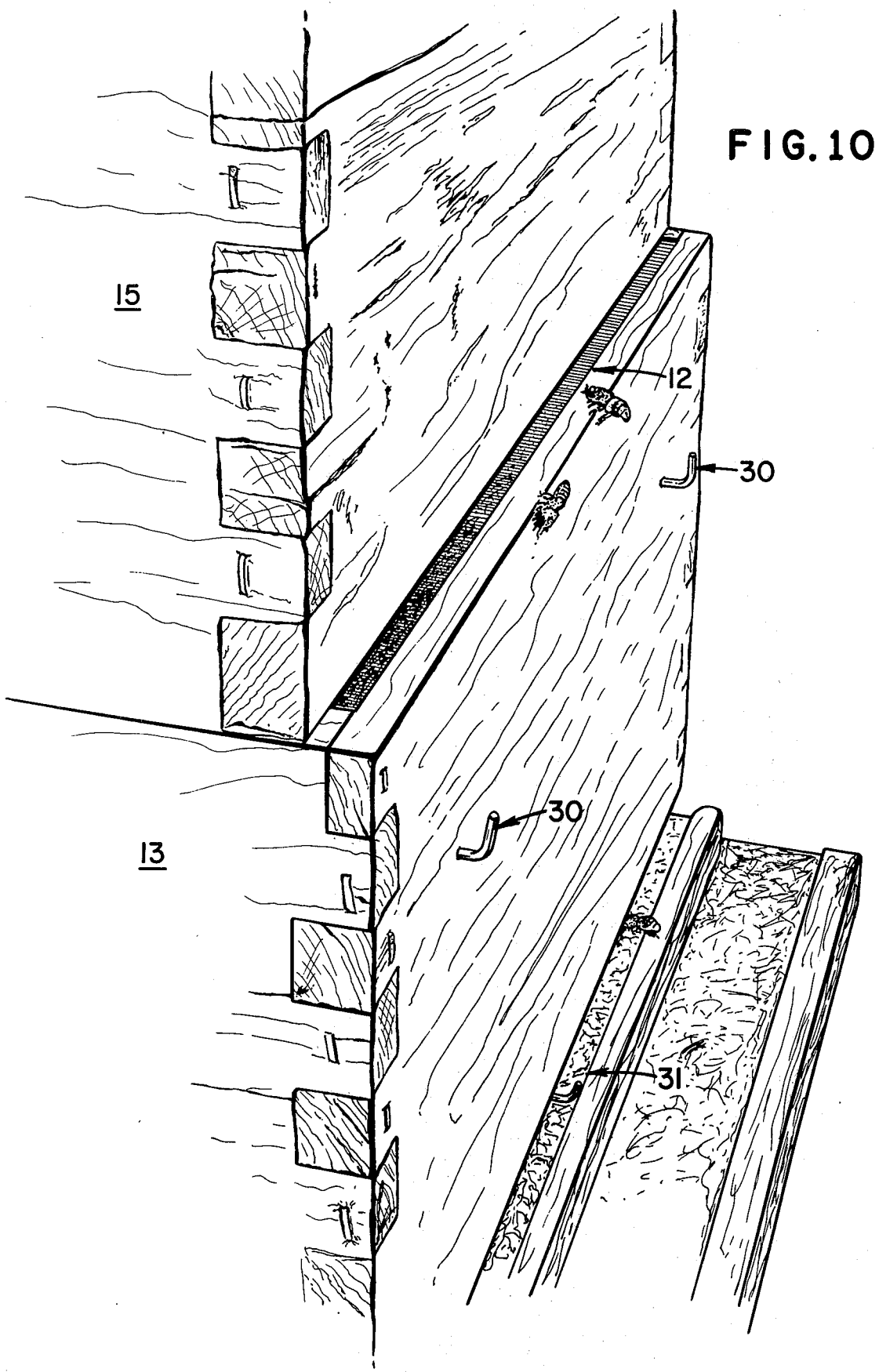

FIG. 10 is a picture of two hives to show where the trap fits, the trap being removed from the hive, the top brood chamber being slid back a bit for an opening for the bees to enter.

Referring to the figures, Fig. 1 shows the invention (pollen trap) attached to an opened hive. Item 1 is the entrance to the pollen trap through which honey bees enter the trap and subsequently into the hive. The bees have to crawl through 2 (pollen grid) which is made of 2 pieces of No. 5 hardware cloth stapled to pieces of wood (Items 18, 19, 20, 21) ⅛ inch in thickness. The function of 2 is to force incoming foraging bees with pollen pellets on their hind legs to twist their bodies through the 2 pieces of No. 5 mesh wire. In twisting through the grid, pollen pellets are scraped off of their legs and fall down through 3 into the pollen drawer 4. Item 3 consists of No. 7 hardware cloth. After crawling through 2, the bees enter 5 which is a loafing area, the floor being a piece of wood which extends beneath 6 which is a second grid of 2 pieces of No. 5 hardware cloth. The two pieces of hardware cloth of 6 are stapled to 3/16 inch wooden frame and the squares in the hardware cloth are not offset as in 2. This permits the bees to crawl through more easily than in 2.

Item 6 rests on 7 which is a piece of ½-inch hardware cloth through which trash (bits of wax, bee body parts, and entire dead bees) is dropped into 8 (trash drawer) as the bees attempt to carry it out of the hive. The deposition of trash into 8 permits the collection of pollen in 4 that is relatively free of foreign matter. If 6 was not present, bees would drop the trash in the pollen drawer as they attempted to crawl through 2.

Four sets of 2 small pieces of wood 9 were nailed to both sides of the pollen trap to act as guides or holders of the grids 2 and 6.

The lid 10 is fastened to one end of the pollen trap with hinges 11. Through the use of hinges 11, the lid 10 can be easily raised for the removal of the pollen grid 2 or the trash grid 6 or both. Removal of 2 and 6 is desirable at times in order to permit the bees to carry pollen, which is their protein food, into the hive for broodrearing.

The bees enter the hive at 12 which is the contact point of the trap and lower hive body 13. Frames 14 containing combs with honey, pollen, and brood are arranged at right angles to the pollen trap. They 14 can be easily removed even though the pollen trap remains attached. A second hive body or brood chamber 15 is placed on top of 13 during normal colony activity.

FIG. 2 is another view of the invention (pollen trap) but depicts more clearly such items as 3, 4, 5, 6, 7, and 8. Item 16 is wire screen material similar to that used in window screens. This finer mesh is used instead of No. 7 hardware cloth because the pollen pellets would fall not of the pollen drawer to the ground. Item 17 is the same as 16. Both 16 and 17 are stapled to the bottom of 4 and 8. They permit a measure of ventilation to pass through the pollen and the removal of water should excessive moisture enter the trap during heavy rains and strong winds. Small dust particles also drop out of the pollen 4 and 8 trash drawers through 16 and 17.

FIG. 3 is another view of the invention but a closer view than FIG. 2.

FIG. 4 is a closeup view of 2 showing the offset hardware cloth 19. Items 18 and 20 are the upper and lower pieces of wood ⅛" in thickness for 2 but 3/16 inch in thickness for 6. The use of a complete wooden frame for 2 and 6 is to insure the presence of an equal space between the 2 screens from one end to the other end of the grids. The offset squares force the bees to twist their bodies as they crawl through the grid 2, thereby removing 80–85% of the pollen being collected by the bees. In 6 the squares are not offset.

Figure 5:
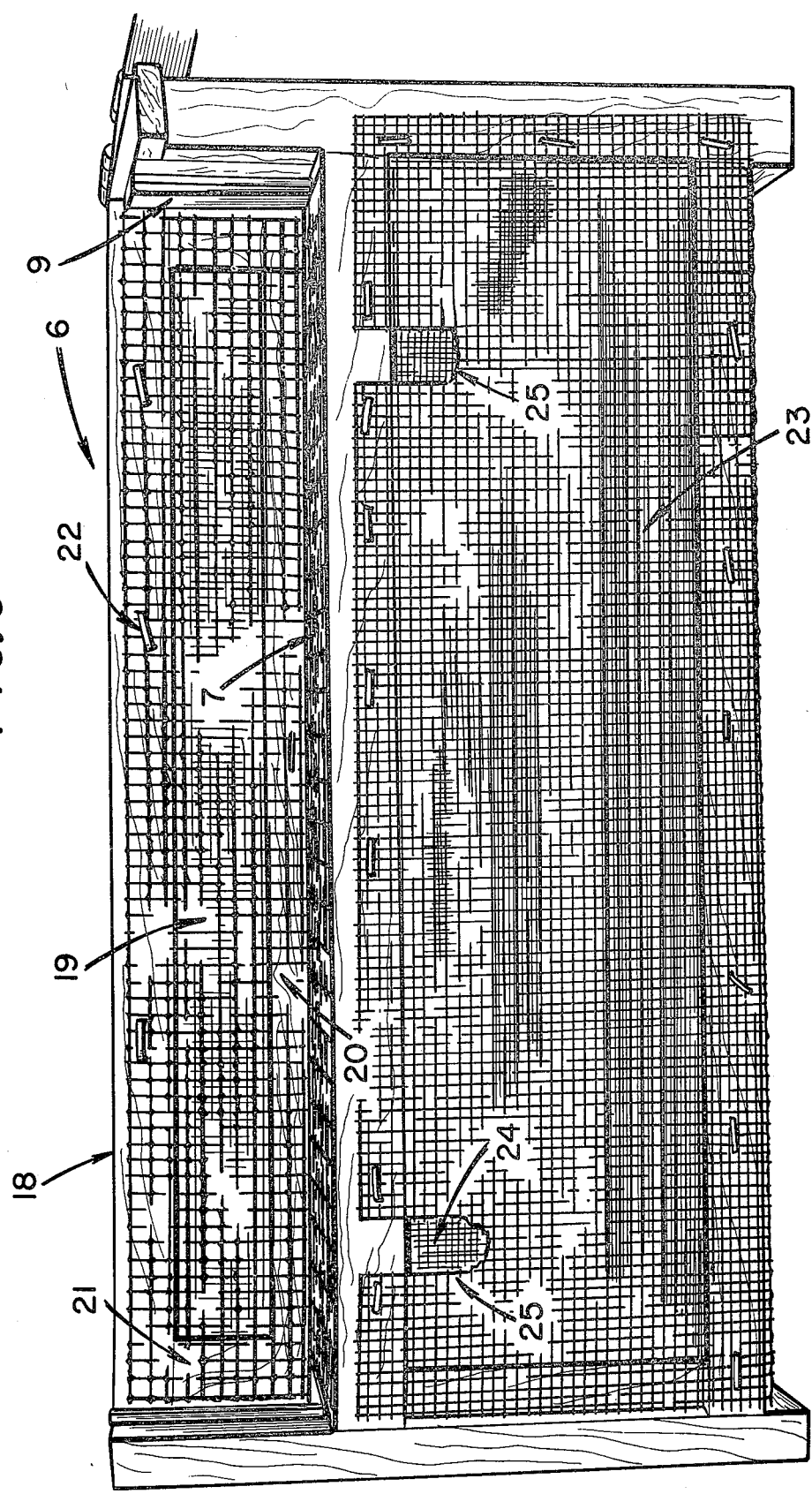

FIG. 5 is a view of the back of the invention (pollen trap) which is held up against the front of the hive 13. Item 21 shows the side pieces for 2 and 6 each having the same relative thickness of the wooden framework in 2 and 6. Item 22 is a standard staple driven into the wooden framework by means of a standard staple gun. Item 23 is a piece of No. 7 hardware cloth stapled to the wooden framework of the pollen trap and is to the side of 8. Item 25 is also a piece of No. 7 hardware cloth that is stapled to the wooden sides of the pollen trap and acts as a dividing board between 4 and 8. The use of 23 and 24 permits good ventilation through the trap. Item 25 is a cut out portion of 23 nd permits the insertion of an L-shaped screw into a ⅛ inch hole drilled into the wooden framework.

FIG. 6 shows the bottom of the invention which is covered by 25 which is a piece of window screen material. It is stapled to the wooden framework and permits ventiltion through the trap. Items 27 and 28 are also pieces of window screen mesh stapled to the bottom framework of 4 and 8. Ventilation and passage of fine dust and possible moisture can occur. Item 29 consists of 2 small wooden extensions measuring ¼" in thickness which rest on top of both sides of the upper surface of 12, FIGS. 1, 2, and 3. The use of 29 raises the trap so that the bees can enter or leave the hive from 1 to 12.

FIG. 7 is a photo of the inside of the trap with the pollen 2 and trash 6 grids removed with would be the situation of the invention when pollen was not being collected. Bee activity both into and out of the hive would be unobstructed.

FIG. 8 shows the trap attached to a two 13 and 15 brood chambered hive. One can see how 29 holds the invention (pollen trap) ¼ inch above 12, FIGS. 1, 2, and 3. Item 30 consists of small hook and eye for holding the lid 10 firmly secured to the invention proper.

FIG. 9 shows the 2 brood chambers separated for easy handling of the frames 14 even with the trap attached.

FIG. 10 shows the gap between 13 and 15 immediately behind 12 through which the bees enter or leave the hive from 1 to 12. The gap is achieved by sliding 15 back ¼ inch from 12. Item 31 is one of two small L-screws twisted into 13 from which the trap hangs 25 FIG. 5 onto the front of 13. Two of these L-screws are needed. Item 32 is the normal bottom entrance to the bee hive that is sealed with a strip of wood while the invention (pollen trap) is being used to trap pollen.

SUMMARY OF THE INVENTION

A general description of the invention is as follows: The pollen trap (made of wood and wire screen (hardware cloth)) hangs off the front of the hive from the top edge of the bottom broodchamber. The regular entrance of the hive is closed, forcing the bees to use the trap entrance. The trap has a hinged lid permitting easy placement or removal of a trash and pollen grid. Beneath each grid is a drawer, each opening to the side of the hive, causing very little disturbance to the bee activity and no flight disturbance. The outer grid (pollen) has two pieces of wire screen, offset to collect the maximum amount of pollen, and the inner grid (trash) has two pieces of wire screen not offset. The trap can be left on the hive indefinitely and all hive manipulations can be carried out without its removal.

I claim:

1. A pollen trap for collecting trash-free pollen from bees as they enter a bee hive, the trap comprising:
   a. A compartmented, substantially rectangular box having an upper and a lower compartment, the box being dimensioned to fit onto a bee hive and consisting of:
      1. a substantially rectangular, hinged horizontal solid top, the back portion of which is extended to fit into the entrance of a bee hive,
      2. a substantially rectangular, vertically positioned solid front side,
      3. a substantially rectangular, horizontally positioned bottom side comprising a very finely screened plane,
      4. a substantially rectangular, vertically positioned screened back side,
      5. a substantially square, vertically positioned left side,
      6. a substantially square, vertically positioned right side having large apertures for receiving a pollen collecting drawer and a trash-collecting drawer,
   b. a pollen-collecting drawer having a very fine screen floor, c. a trash-collecting drawer having a very fine screen floor,
d. the lower compartment comsisting of a chamber for receiving the pollen-collecting drawer and the trash-collecting drawer,
e. the upper compartment providing the passageway for bees, being partitioned longitudinally to form an open ended entry compartment, a screened middle compartment, and an exit compartment, which exit compartment opening directly into the entrance of the bee hive; the screened middle compartment comprising two vertically positioned removable medium gauge double screens, each of which is particularly nonaligned with respect to the other on the same frame and each of which in the same frame is spaced not more than about ⅛ of an inch so that an entering bee will be forced into a slow and circuitous path to divest the legs of the bee of pollen carried thereon, the pollen passing through the fine meshed floor of the upper compartment to gather in the pollen drawer the said exit chamber being provided with a wide mesh floor to collect the bodies of the dead bees as these are carried out of the hive, and
f. means for securing trap to a bee hive.

* * * * *